(12) United States Patent
Laaksonen et al.

(10) Patent No.: US 12,711,982 B2
(45) Date of Patent: Aug. 18, 2026

(54) AUDIO PROCESSING

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 482 days.

(21) Appl. No.: 18/311,371

(22) Filed: May 3, 2023

(65) Prior Publication Data

US 2023/0377600 A1 Nov. 23, 2023

(30) Foreign Application Priority Data

May 17, 2022 (EP) .................................... 22173736

(51) Int. Cl.
*G10L 25/57* (2013.01)
*G10L 15/22* (2006.01)

(52) U.S. Cl.
CPC .............. *G10L 25/57* (2013.01); *G10L 15/22* (2013.01); *G10L 2015/225* (2013.01); *G10L 2015/226* (2013.01)

(58) Field of Classification Search
None
See application file for complete search history.

(56) References Cited

U.S. PATENT DOCUMENTS 5,818,514 A * 10/1998 Duttweiler ....... H04N 21/23614 348/E7.083
5,953,049 A * 9/1999 Horn .................. H04N 21/4341 348/E7.083
9,392,220 B2 * 7/2016 Olofsson ............ H04N 21/2368
2005/0237378 A1 * 10/2005 Rodman ............... H04L 65/403 348/E7.083
2012/0169837 A1 * 7/2012 Olofsson ............ H04N 21/4788 348/E7.078
2016/0293175 A1 * 10/2016 Atti ......................... G10L 19/12
2019/0251970 A1 * 8/2019 Shukla .................... G10L 15/25
2023/0377600 A1 * 11/2023 Laaksonen ............. H04L 65/80

OTHER PUBLICATIONS

"3rd Generation Partnership Project; Technical Specification Group Services and System Aspects; Policy and charging control architecture (Release 17)", 3GPP TS 23.203, V17.2.0, Dec. 2021, pp. 1-270.
Extended European Search Report received for corresponding European Patent Application No. 22173736.4, dated Nov. 8, 2022, 11 pages.
Office action received for corresponding European Patent Application No. 22173736.4, dated Mar. 19, 2025, 5 pages.

* cited by examiner

*Primary Examiner* — Jonathan C Kim
(74) *Attorney, Agent, or Firm* — McCarter & English LLP; Benjamin A. Ailes

(57) ABSTRACT

An apparatus comprising means for:
- classifying an audio signal as at least a first audio signal for time synchronization with a video signal or a second audio signal not for time synchronization with a video signal;
- processing the first audio signal for time synchronization with the video signal wherein the processing introduces a first delay for time synchronization with the video signal;
- processing the second audio signal wherein the processing introduces a second delay shorter than the first delay.

17 Claims, 4 Drawing Sheets

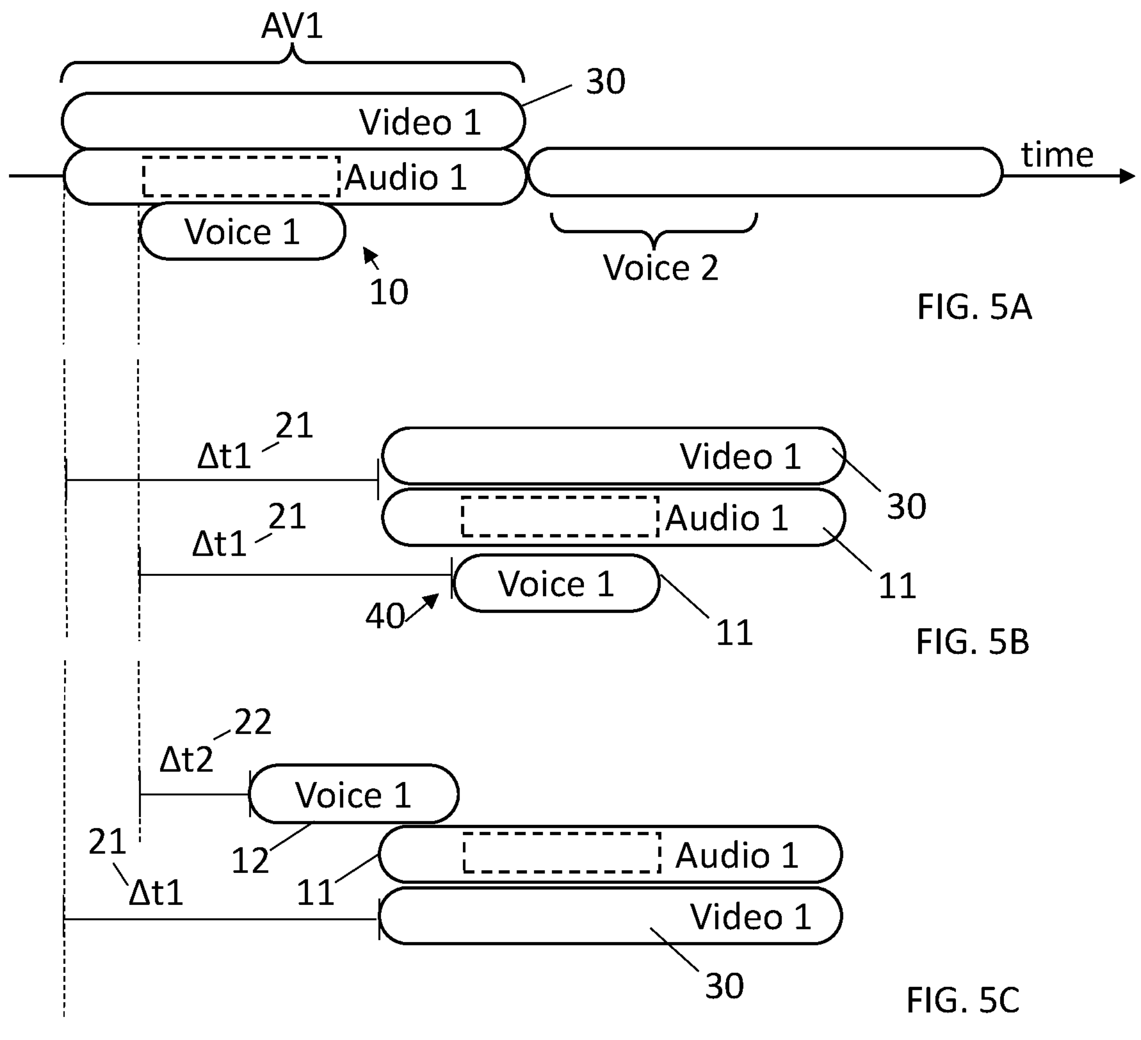
FIG. 5A
FIG. 5B
FIG. 5C
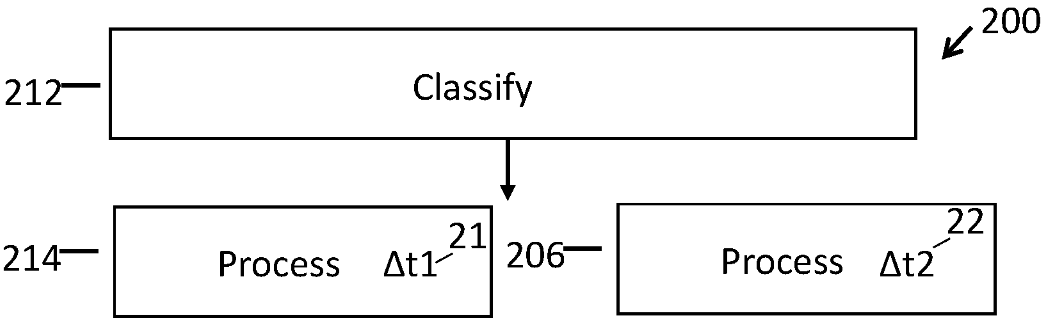
FIG 6

AUDIO PROCESSING

TECHNOLOGICAL FIELD

Embodiments of the present disclosure relate to audio processing. Some relate to audio processing of an audio signal that is contemporaneous with a video signal.

BACKGROUND

In some applications audio and video are rendered contemporaneously.

A passive viewer of television, or some other audio-visual application, has a better experience if the video and its associated audio are synchronized.

If the television content comprises an interviewer and an interviewee, who are communicating live over a satellite link, then the return delay introduced by the satellite link can result in over-talking.

Similar problems can arise in teleconferences and with live streaming.

BRIEF SUMMARY

According to various, but not necessarily all, embodiments there is provided an apparatus comprising means for: classifying an audio signal as at least a first audio signal for time synchronization with a video signal or a second audio signal not for time synchronization with the video signal; processing the first audio signal for time synchronization with the video signal wherein the processing introduces a first delay for time synchronization with the video signal; processing the second audio signal wherein the processing introduces a second delay shorter than the first delay.

In some but not necessarily all examples, the apparatus comprises a first path comprising a first audio coder and a second path comprising a second audio coder, wherein the apparatus is configured to direct the first audio signal along the first path to be processed, with the first delay, by the first audio coder and to direct the second audio signal along the second path to be processed, with the second delay, by the second audio coder.

In some but not necessarily all examples, the second path is optimized for minimum delay.

In some but not necessarily all examples, the first path is optimized for audio-video synchronization.

In some but not necessarily all examples, the apparatus is configured to process the video signal; wherein the first delay is adjusted to time synchronize the processed first audio signal with the processed video signal wherein an event in the processed video signal that produces a sound is time synchronized with the produced sound in the processed first audio signal.

In some but not necessarily all examples, the apparatus is configured to classify an audio signal as a second audio signal by classifying the audio signal as a speech signal.

In some but not necessarily all examples, the apparatus is configured to classify an audio signal as a first audio signal by classifying the audio signal as a non-speech signal.

In some but not necessarily all examples, the apparatus is configured to classify an audio signal as a second audio signal by classifying the audio signal as a conversational speech signal.

In some but not necessarily all examples, the apparatus is configured to classify an audio signal as a first audio signal by classifying the audio signal as a non-conversational speech signal.

In some but not necessarily all examples, the apparatus is configured to classify the audio signal using audio analysis of the audio signal and/or video analysis of the video signal.

In some but not necessarily all examples, the apparatus is configured to identify a sound source in the video signal, and classify an audio signal associated with the identified sound source as a first audio signal.

In some but not necessarily all examples, the apparatus is configured to identify a sound source as not being in the video signal, and classify the audio signal associated with the identified sound source as a second audio signal.

In some but not necessarily all examples, the apparatus is configured to process the second audio signal wherein the processing of the second audio signal introduces the first delay such that the processed first audio signal and the processed second audio signal are time synchronized.

According to various, but not necessarily all, embodiments there is provided a computer program that when run on a processor causes: classifying a received audio signal as a first audio signal or a second audio signal, wherein the second audio signal is to be processed with less delay than the first audio signal; processing the first audio signal wherein the processing introduces a first delay; processing the second audio signal wherein the processing introduces a second delay, wherein the second delay is shorter than the first delay.

According to various, but not necessarily all, embodiments there is provided a method comprising: classifying a received audio signal as a first audio signal or a second audio signal, wherein the second audio signal is to be processed with less delay than the first audio signal; processing the first audio signal wherein the processing introduces a first delay; processing he second audio signal wherein the processing introduces a second delay, wherein the second delay is shorter than the first delay.

According to various, but not necessarily all, embodiments there is provided examples as claimed in the appended claims.

BRIEF DESCRIPTION

Some examples will now be described with reference to the accompanying drawings in which.

Figure 7:
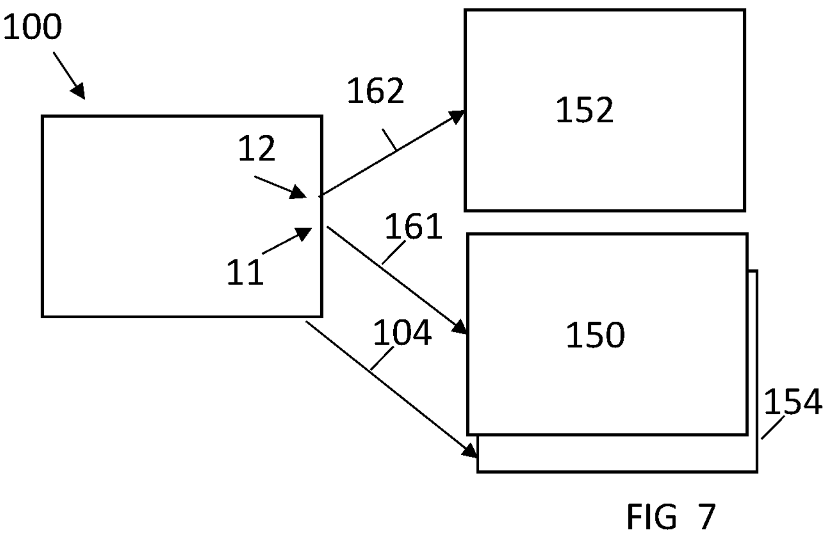
Figure 8:
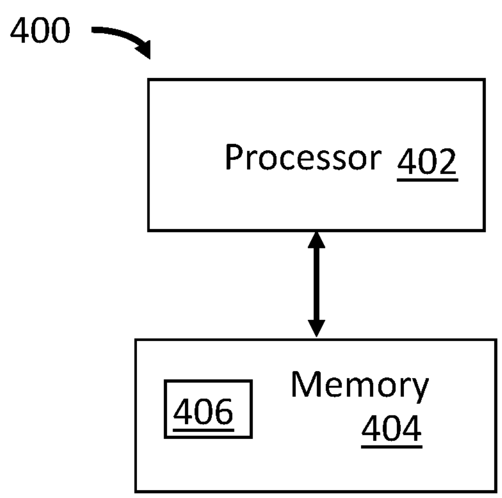
Figure 9:
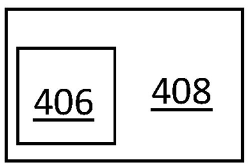

FIGS. 5A, 5B and 5C share a common time frame; FIG. 5A illustrates an audio signal and a video signal that has associated audio; FIG. 5B illustrates the audio signal after it has been classified as a first audio signal for time synchronization with the video signal and, after processing, has a first longer delay; FIG. 5C illustrates the audio signal after it has been classified as a second audio signal and, after processing, has a second shorter delay;

FIG. 6 illustrates an example of a method for classifying an audio signal and selectively delaying the audio signal based on the classification FIG. 7 illustrates a system for rendering processed audio;

FIG. 8 illustrates an example of a controller for the apparatus;

FIG. 9 illustrates an example of a computer program for the controller.

DETAILED DESCRIPTION

The following examples relate to an apparatus 100 comprising means for:

classifying 212 an audio signal 10 as at least a first audio signal 11 for time synchronization with a video signal 30 or a second audio signal 12 not for time synchronization 40 with a video signal 30;

processing the first audio signal 11 for time synchronization 40 with the video signal 30 wherein the processing introduces a first delay 21 for time synchronization 40 with the video signal 30; and processing the second audio signal 12 wherein the processing introduces a second delay 22 shorter than the first delay 21.

Figure 1:
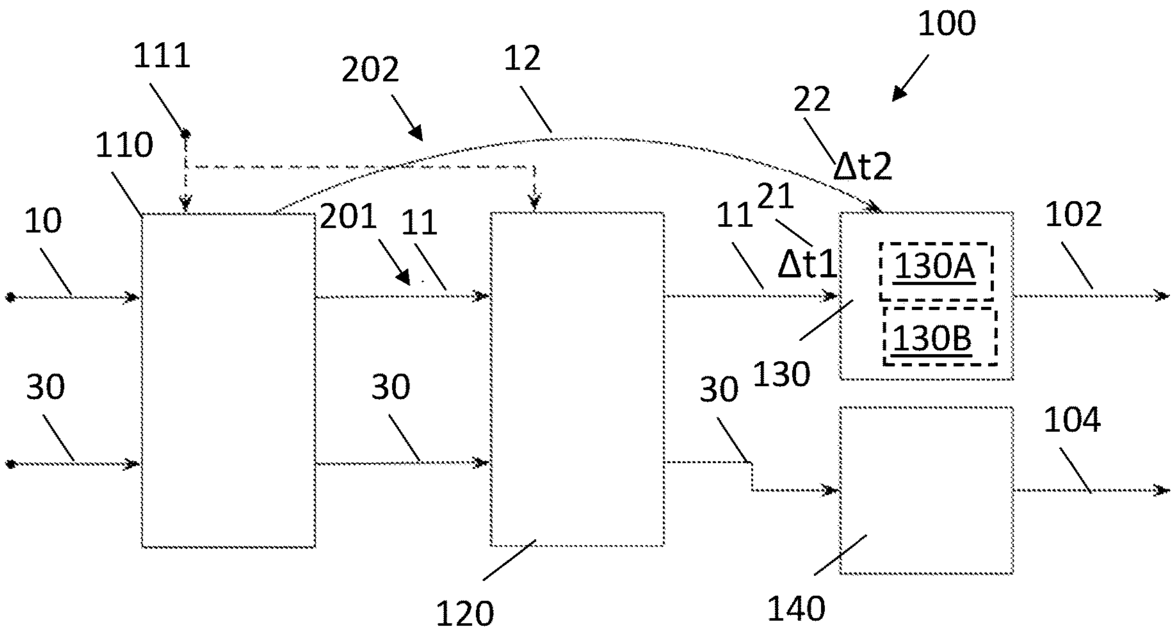
FIG. 1 illustrates an example of an apparatus for classifying an audio signal and selectively delaying the audio signal based on the classification.
Figure 2:
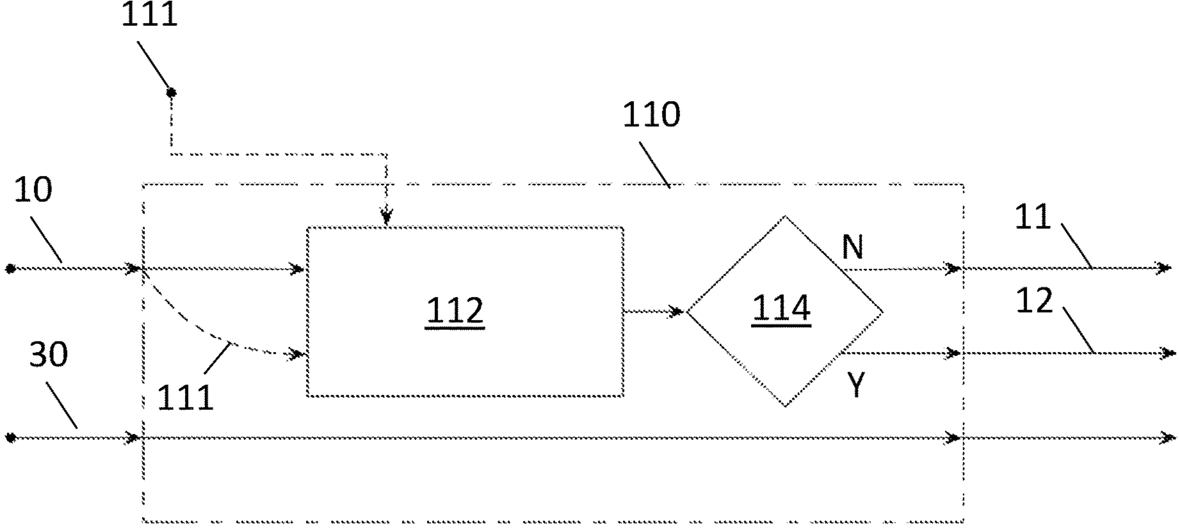
FIG. 2 illustrates an example of a classifier configured to classify for speech.
Figure 3:
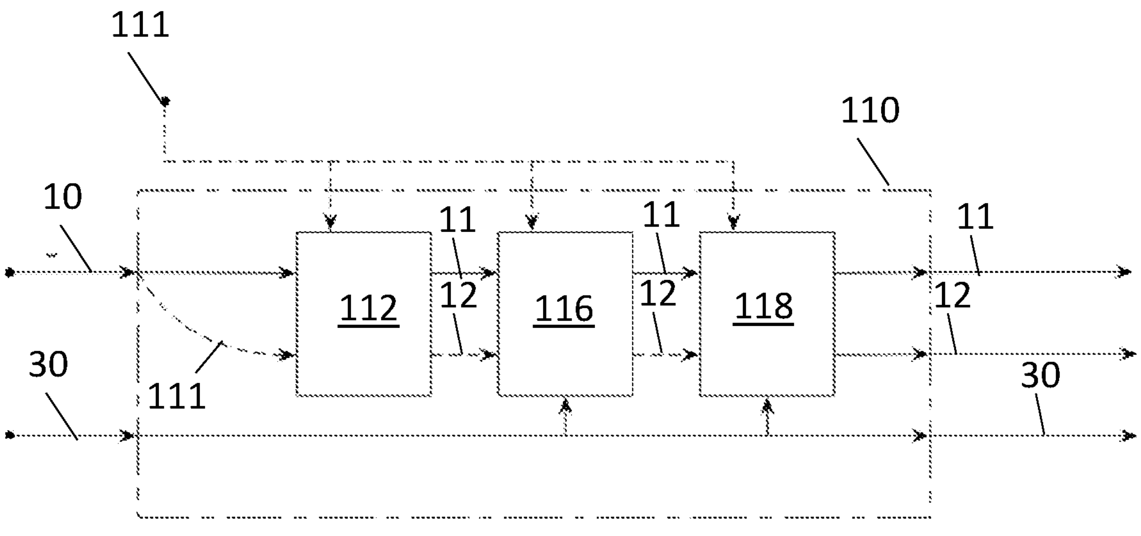
FIG. 3 illustrates an example of a classifier configured to classify for conversational speech.
Figure 4:
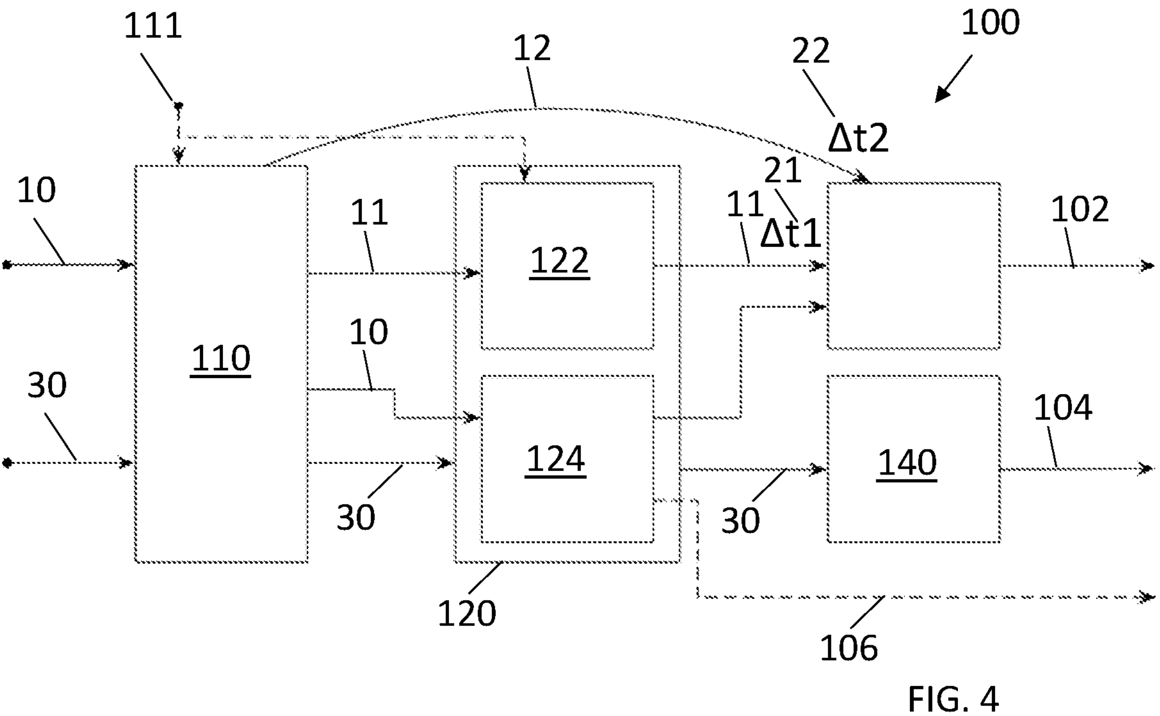
FIG. 4 illustrates another example of an apparatus for classifying an audio signal and selectively delaying the audio signal based on the classification.

FIGS. 1 and 4 illustrate examples of the apparatus 100. In these examples a classifier 110 performs the classification 212. Examples of different classifiers 110 are illustrated in FIGS. 2 and 3. The classifier in FIG. 2 classifies for speech. The classifier in FIG. 3 classifies for conversational speech. FIG. 5A illustrates an audio signal 10 (Voice 1) and video signal 30 that has associated audio which may or may not be the voice signal 10. In FIG. 5B, the audio signal 10 (Voice 1) has been classified as a first audio signal 11 for time synchronization with the video signal 30 and, after processing, has a first delay 21 for time synchronization 40 with the video signal 30 (and its associated audio signal). In FIG. 5C, the audio signal 10 (Voice 1) has been classified as a second audio signal 12 as is not for time synchronization with the video signal 30. The second audio signal 12, after processing, has a second delay 22, shorter than the first delay 21. FIG. 6 illustrates a method 200 for classifying 202, processing 214 the first audio signal 11 and processing 206 the second audio signal 12.

FIG. 1 illustrates an apparatus 100, for selectively delaying an audio signal 10. The selective delay is based on classification of the audio signal 10.

The apparatus 100 receives at least an audio signal 10 and a video signal 30. In some but not necessarily all examples, the video signal 30 has an associated audio signal (not illustrated in this FIG) that provides audio for the video images.

The apparatus 100 comprises a classifier 110 configured to classify an audio signal 10 as a first audio signal 11 or a second audio signal 12. The first audio signal 11 is to be time synchronized with the video signal 30. The second audio signal 12 is not to be time synchronized with be time the video signal 30.

The apparatus 100 comprises a synchronizer 120 for time-synchronizing an audio signal 10 classified as a first audio signal 11 with the video signal 30. The processing performed by the synchronizer 120 on the first audio signal 11 introduces a first delay 21 to the first audio signal 11 which results in time synchronization of the audio signal 10 (classified as the first audio signal 11) with the video signal 30.

Time synchronization means that the audio is rendered at the correct corresponding moment in the video rendering. In some examples, the first delay 21 that achieves time synchronization is fixed. In some examples, the first delay 21 that achieves time synchronization is variable and, in some examples, dynamically adjusts to timing differences arising between the audio signal 10 (first audio signal 11) and the video signal 30. For example, in some examples the apparatus receives contemporaneously, the audio signal 10 and a video signal 30, whereas in other examples the apparatus can respond to receiving the audio signal 10 and a video signal 30 with a relative time delay that may be fixed or variable.

In some but not necessarily all examples, the first delay 21 synchronizes the processed first audio signal 11 with the processed video signal 30 so that an event in the processed video signal 30 that produces a sound is time synchronized with that sound in the processed first audio signal 11. In some but not necessarily all examples, the first delay 21 is adjusted to time synchronize the processed first audio signal 11 with the processed video signal 30 so that an event in the processed video signal 30 that produces a sound is time synchronized with that sound in the processed first audio signal 11.

In some but not necessarily all examples, the synchronizer 120 receives control information 111 relating to audio encoding delay and video encoding delay and matches the sync between the first audio signal 11 and the video signal 30 by applying a correcting delay to one of the signals (assumed to be the first audio signal 11 that needs to be delayed). For example, the first audio signals 11 are delayed by value given by video_delay−audio_delay. The synchronizer 120 can additionally, take into account further mismatches in audio-video (AV) sync. For example, there can be delays relating to any processing prior to the synchronizer 120 including those incurred in capturing and/or delays relating to any processing after the synchronizer 120. These delays may be received as control information 111 and can be created from image analysis of the video signal 30 and/or audio analysis of the first audio signal 11 or from metadata associated with the audio signal 10 and/or metadata associated with the video signal 30.

In this example, but not necessarily all examples, the apparatus 100 comprises a video coder 140 that processes the video signal 30 and produces an encoded video signal 104.

In this example, but not necessarily all examples, the apparatus 100 comprises an audio coder 130 that processes the audio signal 10 and produces an encoded audio signal 102. In some examples, the same audio coder 130 is used to encode the audio signal 10 whether it is classified as a first audio signal 11 or classified as a second audio signal 12.

In other examples, the apparatus 100 does not comprise an audio coder 130. In still other examples, for example as illustrated, the apparatus 100 comprises multiple audio coders. A first audio coder 130A processes the first audio signal 11 (the audio signal 10 when classified as the first audio signal 11) and produces an encoded audio signal 102 and a second, different, audio coder 130B processes the second audio signal 12 (the audio signal 10 when classified as the second audio signal 12) and produces an encoded audio signal 102.

In some but not necessarily all examples, the classifier 110 and/or the synchronizer 120 receive control information 111 that assists in the respective tasks of classification and synchronization.

In some but not necessarily all examples, the control information 111 is obtained by processing the audio signal 10 and/or the video signal. In some but not necessarily all examples, the control information 111 is alternatively or additionally obtained, as metadata, from the audio signal 10 and/or the video signal.

In this example, the apparatus 100 comprises a first path 201 and a second path 202, the apparatus 100 is configured to direct the first audio signal 11 along a first path 201 to be processed, with the first delay 21, and to direct the second audio signal 12 along the second path 202 to be processed, with the second delay 22.

In some but not necessarily all examples, the second path 202 is optimized for minimum delay. In some but not necessarily all examples, the first path 201 is optimized for audio-video synchronization, that is to achieve time synchronization between the first audio signal 11 and the video signal 30.

The outputs from the paths 201, 202 are encoded individually, or jointly for example as a downmixed signal, using a conversational speech and audio coder. In some examples, only the low-delay audio signal (second audio signal 12) is encoded using a conversational coder, while the first audio signal 11 is encoded using a different coder, e.g., a generic audio coder with a longer algorithmic delay.

Thus, in some but not necessarily all examples, the first path 201 comprises a first audio coder 103A and the second path 202 comprises a second audio coder 1308.

The apparatus 100 is configured to direct the first audio signal 11 along the first path 201 to be processed, with the first delay 21, by the first audio coder 130A and to direct the second audio signal 12 along the second path 202 to be processed, with the second delay 22, by the second audio coder 130B.

In the example where a common audio coder 130 is used for the first audio signal 11 and the second audio signal 12, then the first delay 21 and the second delay 22 can be measured and compared before or after the audio coder 130. In the example where a different audio coders 130A, 130B, that introduce different delays, are used for the first audio signal 11 and the second audio signal 12, then the first delay 21 and the second delay 22 can be measured and compared after the audio coders 130A, 130B.

In some but not necessarily all examples, the audio signal 10 may be signals representing different audio objects.

In some examples the apparatus 100 can be a preprocessor, for example an IVAS preprocessor, that classifies sound (audio signal 10) into low-delay objects (second audio signal 12) and video-delay objects (first audio signal 11) and puts them to different paths 201, 202, for example, different streams for different audio coders 130A, 130B.

The acronym IVAS relates to immersive voice and audio services. This includes immersive voice and audio for virtual reality (VR). There is on-going activity in developing an IVAS audio coder. The multi-purpose IVAS audio coder is expected to handle the encoding, decoding, and rendering of speech, music, and generic audio. It will be expected to receive and process audio signals 10 in various formats, including stereo format, multi-channel format, object-based audio format, Ambisonics format, and the metadata-assisted spatial audio (MASA) format. The MASA format enables practical spatial audio capture using a smartphone or similar device. It uses audio signal 10 together with corresponding spatial metadata, control information 111, (containing, e.g., directions and direct-to-total energy ratios in frequency bands).

The apparatus 100 can therefore be configured for use in an IVAS system, or other audio coding systems. The apparatus 100 can therefore be configured to receive and process an audio signal 10 in the MASA format, or other formats. The audio signal 10 can be, e.g., mono, stereo, or various spatial audio formats including audio objects and MASA.

Although the classifier 110, in this example is a simple two class classifier with two different associated delays 21, 22. In other examples, the classifier can be a multi-class classifier. In some but not necessarily all examples, the different classes of the multi-class classifier are each associated with a different delay.

The classifier 110 can be any suitable audio classifier. There is significant existing literature on the classification of audio. The classification can for example be based on spectral analysis of audio time segments (audio frames). These frames can, for example be 20 ms. The spectral analysis can take different forms. It can for example be a mel spectral analysis. The classification can be based on audio models or on learned models. For example, machine learning can be used for classification. The use of machine earning for audio and visual classification is well documented. Visual classification approaches can be used if the audio signal 10 is represented as a spectrograph.

The classification can be based on the audio signal 10 that is the audio content and/or on the video signal 30 that is the video content. The classification can additionally or alternatively be based on contextual control information 111.

The contextual control information can, for example, be metadata associated with the audio signal 10 and/or metadata associated with the video signal 30.

The contextual control information can, for example, indicate a direction of a sound source that produces the audio signal 10 and/or a direction of video capture that produces the video signal 30

FIG. 2 illustrates an example of a classifier 110 suitable for use in the apparatus 100. The classifier 110 is configured to classify an audio signal 10 as a second audio signal 12 by classifying the audio signal 10 as a speech signal and configured to classify an audio signal 10 as a first audio signal 11 by classifying the audio signal 10 as a non-speech signal.

The classifier 110 comprises a speech detector 112 and decision logic 114. If speech is detected in the audio signal 10 by the speech detector 112, then the decision logic classifies the audio signal 10 as a second audio signal 12. If speech is not detected in the audio signal 10 by the speech detector 112, then the decision logic classifies the audio signal 10 as a first audio signal 11.

The speech detector can be any suitable speech detector or voice activity detector (VAD). Examples of voice activity detectors are specified in various telecommunication standards.

In this example, the speech signal (the second audio signal 12) is processed with a minimum delay.

FIG. 3 illustrates an example of a classifier 110 suitable for use in the apparatus 100.

In this example, the classifier 110 is configured to classify an audio signal 10 as a second audio signal 12 by classifying the audio signal 10 as a conversational speech signal and configured to classify an audio signal 10 as a first audio signal 11 by classifying the audio signal 10 as not conversational speech.

The classifier 110 comprises a speech detector 112 as previously described with reference to FIG. 2.

The classifier 110 also comprises a first-stage analyzer 116 for analysis of speech and/or audio. This can for example be used to detect speech that is or is not associated with the video or speech that is or is not conversational. In some examples, video analysis is used.

The classifier 110 also comprises a second-stage analyzer 118 for analysis of non-conversational audio-visual analysis. This can for example be used to detect whether speech is conversational. In some examples, video analysis is used.

The classifier 110 classifies the audio signal 10 as:

i) speech (conversational)

ii) speech (non-conversational)

iii) non-speech

In comparison to FIG. 2, it therefore sub-classifies speech into conversational speech, that is speech that is part of a live, two-way conversation and non-conversational speech that is speech that is not part of a live two-way conversation.

Speech can in some examples be classified as non-conversational speech because it is audio-visual speech, that is it is speech associated with the video signal 30.

The classifier 110 classifies the audio signal 10 that has been classified as conversational speech as the second audio signal 12. The classifier 110 otherwise classifies the audio signal 10 as the first audio signal 11. The classifier 110 therefore classifies the audio signal 10 that has been classified as non-conversational speech as the first audio signal 11. The classifier 110 therefore classifies the audio signal 10 that has been classified as non-speech as the first audio signal 11.

In this example, the conversational speech signal (the second audio signal 12) is processed with a minimum delay.

The classification of speech as conversational (or not) can be based on analysis of the audio signal 10. In some but not necessarily all examples, the classification of speech as conversational (or not) can additionally be based on analysis of the video signal 30.

The classification of speech as conversational (or not) can for example be based on a speech model e.g., detecting pauses, delays, discourse markers such as 'um', 'er' etc.

The classification of speech as conversational (or not) can for example be based on a content analysis model e.g., the meaning of the words used are not associated with the video.

The classification of speech as conversational (or not) can for example be based on a trained convolutional neural network (or other machine learning algorithm). The convolutional neural network is trained to recognized conversational speech through training examples.

In some examples, the classifier 110 is configured to identify a sound source in the video signal 30, and classify an audio signal 10 associated with the identified video sound source as a first audio signal 11.

In some examples, the video sound source in the video signal 30 may be taken to be a direction of video capture, or by detecting lip movement (or some other visual indicator of sound creation) some sub-portion of the camera field of view. An audio signal 10 can be associated with the video sound source in the video if a direction of audio capture for the audio signal 10 spatially corresponds (matches) the respective direction of video capture, or sub-portion of the camera field of view.

20 Additionally or alternatively, an audio signal 10 can be associated with a video sound source in the video signal 30 if the timing of the lip movement in the video is contemporaneous with speech in the audio signal 10 or the visual indicator of sound creation in the video is contemporaneous with a sound or expected sound in the audio signal 10.

In some examples, the classifier 110 is configured to identify a sound source as not being in the video signal 30, and classify the audio signal 10 associated with the identified sound source as a second audio signal 12.

Thus, in some examples, the classifier 110 classifies the audio signal 10 as sound associated with the video signal 30 and classifies the audio signal 10 as a first audio signal 11 or classifies the audio signal 10 as sound not associated with the video signal 30 and classifies the audio signal 10 as a second audio signal 12.

The classifier 110 can also take into consideration other factors such as location of a sound source, an identifier of a sound source, language of a sound sources, emotion of a sound source etc.

FIG. 4 illustrates an example of an apparatus 100 as previously described. It may comprise a classifier 110 as previously described.

The apparatus 100 is configured to produce different output data streams (encoded audio and video signals 102, 104) for different end-uses. For example, different data output 10 streams are created in dependence upon whether or not a receiver of the data stream is an active speaking (or potentially speaking) participant in a conversation or is merely listening.

If the receiver is participating then there is a requirement for fast processing of conversational speech. Therefore, if the receiver is participating in the conversational audio the audio signal 10 for conversational speech is classified as a second audio signal 12.

If the receiver is not participating then there is not a requirement for fast processing of conversational speech and audio video synchronization is prioritized. Therefore, if the receiver is not participating in the conversational audio the audio signal 10 for conversational speech is classified as a first audio signal 11.

The system also provides for synchronization at the receiver by providing synchronization information 106 with the encoded audio and video signals 102, 104.

25 The synchronization information 106 allows different encoded audio and video signals 102, 104 received from different sources to be time-synchronized at the receiver.

This synchronization can be optional if the receiver is participating in the conversational speech as all the encoded audio and video signals 102, 104 should be sent with minimum delay. However, it can still be used if desired.

This synchronization is particularly useful if the receiver is not participating in the conversational speech as all the encoded audio and video signals 102, 104 are not then sent with a minimum delay and the delays may vary.

The 'participant' processing block 122 processes the first audio signal 11 as described in previous examples to obtain audio-video synchronization for the first audio signal 11 but not for the second audio signal 12 which is processed with less delay.

The 'non-participant' processing block 124 processes the audio signal 10 (this could include audio signals classified as first audio signals 11 or second audio signals 12) to obtain audio video synchronization for the first audio signals 11 and the second audio signals 12.

The apparatus 100 is therefore configured to operate in different modes for a receiver (listener).

In a participant mode the apparatus 100 is configured to process 122 the first audio signal 11 to introduce a longer first delay 21 and process the second audio signal 12 to introduce a shorter second delay 22 such that the processed first audio signal 11 and the processed second audio signal 12 are not simultaneous at the participant receiver (listener). This occurs when the second audio signal 12 relates to conversational speech and the receiver (listener) is participating in the conversational speech.

In a non-participant mode, the apparatus 100 is configured to process 124 both the first audio signal 11 and the second audio signal 12 (i.e. the audio signal 10) to introduce a longer first delay 21. Thus, the processing block 124 receives the audio signal 10 (first audio signal 11 and the second audio signal 12) and is configured to process the first audio signal 11 to introduce a longer first delay 21 and process the second audio signal 12 to introduce the longer first delay 21 (not the shorter second delay 22) such that the processed first audio signal 11 and the processed second audio signal 12 are simultaneous at the non-participant receiver (listener). This occurs when the second audio signal 12 relates to conversational speech but the receiver (listener) is not participating in the conversational speech.

Therefore, the apparatus 100 can be configured to detect when a receiver (listener) changes between participating in conversational speech and not-participating in conversational speech and in response to the detection can switch between the different modes. In some but not necessarily all examples, the longer first delay 21 can be used for audio-video synchronization.

FIG. 5A illustrates, on a time line, an audio signal 10 (Voice 1) and video signal 30 (Video 1) that has associated audio (Audio 1). The video signal 30 (Video 1) that has associated audio (Audio 1) together form an audio-visual signal (AV1). A portion of the associated audio (Audio 1), illustrated with dotted lines, is contemporaneous with the audio signal 10 (Voice 1).

There is a possibility of a further audio signal 10 (Voice 2), at a later time.

In FIG. 5B, the audio signal 10 (Voice 1) has been classified as a first audio signal 11 for time synchronization with the video signal 30 and, after processing, has a first delay 21 for time synchronization 40 with the video signal 30 (and its associated audio signal). In this FIG, the audio signal 10 (Voice 1), the video signal 30 (Video 1) and its associated audio (Audio 1) have all been delayed by the same delay—the first delay 21. Time synchronization is maintained between the audio-visual signal and the audio signal 10 (Voice 1). The portion of the associated audio (Audio 1), illustrated with dotted lines, remains contemporaneous with the audio signal 10 (Voice 1).

In FIG. 5C, the audio signal 10 (Voice 1) has been classified as a second audio signal 12 that is, not for time synchronization with the video signal 30. In this FIG, the audio signal 10 (Voice 1) has been delayed by a short delay—the second delay 22, whereas the AV signal comprising the video signal 30 (Video 1) and its associated audio (Audio 1) has been delayed by a longer delay—the first delay 21. Time synchronization is not maintained between the audio-visual signal and the audio signal 10 (Voice 1). The portion of the associated audio (Audio 1), illustrated with dotted lines, no longer remains contemporaneous with the audio signal 10 (Voice 1).

The audio signal 10 (Voice 1) does not occur contemporaneously with Voice 2.

It will therefore be appreciated that, in at least some examples, the apparatus 100 comprises means for:

receiving contemporaneously multiple audio signals 10;

classifying the received multiple audio signals 10 to identify first audio signals 11 and second audio signals 12, wherein the second audio signals 12 are to be processed with less delay than the first audio signals 11;

processing the first audio signals 11 wherein the processing introduces a first delay 21;

processing the second audio signal 12 wherein the processing introduces a second delay 22, wherein the second delay 22 is shorter than the first delay 21 such that the processed first audio signals 11 and the processed second audio signals 12 are no longer contemporaneous.

In some but not necessarily all examples, the longer first delay 21 can be used for time synchronization of the first audio signal 11 with the video signal 30. Other reasons for having different delays include balancing bit rate, quality, and delay where, for example, quality and delay can be traded.

FIG. 6 illustrates an example of a method 200.

The method 200 comprises at block 212 classifying a received audio signal 10 as a first audio signal 11 or a second audio signal 12, wherein the second audio signal 12 is to be processed with less delay than the first audio signal 11.

The method 200 comprises at block 214 processing the first audio signal 11 wherein the processing introduces a first delay 21.

The method 200 comprises at block 206 processing the second audio signal 12 wherein the processing introduces a second delay 22, wherein the second delay 22 is shorter than the first delay 21.

FIG. 7 illustrates an example of a system comprising the apparatus 100 and one or more audio rendering devices 150, 152 for rendering the encoded audio signals 102, when based on the first audio signal 11 (referred to and labelled as the coded first audio signal 161) and for rendering the encoded audio signals 102 when based on the second audio signal 12 (referred to and labelled as the coded second audio signal 162).

The apparatus 100 is configured to cause rendering of the processed first audio signal 11 at a first audio rendering device 150 and rendering of the processed second audio signal 12 at a second audio rendering device 152 that is different to the first audio rendering device 150.

For example, conversational audio (second audio signal 12) can be rendered using devices headphones 152 (with transparency), while non-conversation audio signal (first audio signal 11) can be rendered by a loudspeaker system 150 connected or associated with a video rendering device 154 (e.g., smartphone loudspeakers) for rendering the encoded video signal 104 or video signal 30.

It will be appreciated from the forgoing that the apparatus 100 can be used in many applications including, but not limited to video conferencing, live streaming, conversational services and other applications where a low end-to-end delay can be preferable compared, for example, to maintaining audio and video time synchronization or other aspects of quality.

The apparatus 100, in some examples, can achieve the lowest possible delay for conversational audio to make discussions as effortless and natural as possible. At the same time, especially audio that relates to what is seen in the video can be synchronized with the visual content, which leads to reduced viewer irritation.

For conversational use, the lowest possible audio delay can be achieved, in some examples. For many other audio content, it still remains important to provide AV sync. This may also include speech in some cases, e.g., when the talker is not a participant.

The media stream delivery can in embodiments be done in various ways. For example, the transmitting system can packetize low-delay content and AV synced content separately. This may allow for different priority levels. For example, considering 3GPP TS 23.203, we could associate the different content streams with QoS Class Identifiers (QCI) '1' and '2', respectively, or '1' and '7', respectively, for different packet delay budget, packet error loss rate, and resource type characteristics:

'1'—e.g., conversational voice

'2'—e.g., conversational video

'7'—e.g., voice, video (live streaming)

Alternatively, the content can be packetized commonly.

Furthermore, in some examples, different types of audio content can be forwarded for rendering by different types of presentation devices. For example, conversational audio signals 10 can be presented using headphones (with transparency), while non-conversation audio signals 10 can be presented by loudspeaker system connected with the video presentation screen (e.g., smartphone loudspeakers).

FIG. 8 illustrates an example of a controller 400 for the apparatus 100. Implementation of a controller 400 may be as controller circuitry. The controller 400 may be implemented in hardware alone, have certain aspects in software including firmware alone or can be a combination of hardware and software (including firmware).

As illustrated in FIG. 8 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 100 when loaded into the processor 402. The computer program instructions, of the computer program 406, provide the logic and routines that enables the apparatus to perform the methods illustrated in the Figs. The processor 402 by reading the memory 404 is able to load and execute the computer program 406.

The apparatus 100 therefore comprises:

at least one processor 402; and at least one memory 404 including computer program code the at least one memory 404 and the computer program code configured to, with the at least one processor 402, cause the apparatus 100 at least to perform:

classifying a received audio signal 10 as a first audio signal 11 or a second audio signal 12, wherein the second audio signal 12 is to be processed with less delay than the first audio signal 11;

processing the first audio signal 11 wherein the processing introduces a first delay 21; and processing the second audio signal 12 wherein the processing introduces a second delay 22, wherein the second delay 22 is shorter than the first delay 21.

As illustrated in FIG. 9, the computer program 406 may arrive at the apparatus 100 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 100 may propagate or transmit the computer program 406 as a computer data signal.

Computer program instructions for causing an apparatus to perform at least the following or for performing at least the following: classifying a received audio signal 10 as a first audio signal 11 or a second audio signal 12, wherein the second audio signal 12 is to be processed with less delay than the first audio signal 11; processing the first audio signal 11 wherein the processing introduces a first delay 21; processing the second audio signal 12 wherein the processing introduces a second delay 22, wherein the second delay 22 is shorter than the first delay 21.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device. The blocks illustrated in the FIG. 6 (and others) may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects rendering of audio with different delays.

As used here 'module' refers to a unit or apparatus that excludes certain parts/components that would be added by an end manufacturer or a user. The apparatus can be a module.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory storing instructions that, when executed by the at least one processor, cause the apparatus at least to:

receive or obtain at least two partially temporally overlapping audio signals and a video signal for processing;

classify a first audio signal of the at least two partially temporally overlapping audio signals for time synchronization with the video signal by classifying the first audio signal as a non-speech signal;

classify a second audio signal of the at least two partially temporally overlapping audio signals not for time synchronization with the video signal by classifying the second audio signal as a speech signal;

process the first audio signal for time synchronization with the video signal wherein the processing introduces a first delay for time synchronization with the video signal; and process the second audio signal wherein the processing introduces a second delay shorter than the first delay.

2. The apparatus as claimed in claim 1, comprising a first path comprising a first audio coder and a second path comprising a second audio coder, wherein the apparatus is further caused to:

direct the first audio signal along the first path to be processed, with the first delay, by the first audio coder; and direct the second audio signal along the second path to be processed, with the second delay, by the second audio coder.

3. The apparatus as claimed in claim 2, wherein the second path is optimized for minimum delay.

4. The apparatus as claimed in claim 2, wherein the first path is optimized for audio-video synchronization.

5. The apparatus as claimed in claim 1, wherein the apparatus is further caused to:

process the video signal;

wherein the first delay is adjusted to time synchronize the processed first audio signal with the processed video signal, and wherein an event in the processed video signal that produces a sound is time synchronized with the produced sound in the processed first audio signal.

6. The apparatus as claimed in claim 1, wherein the apparatus is further caused to:

classify the second audio signal by classifying the audio signal as a conversational speech signal.

7. The apparatus as claimed in claim 1, wherein the apparatus is further caused to:

classify the first audio signal by classifying the audio signal as a non-conversational speech signal.

8. The apparatus as claimed in claim 1, wherein the apparatus is further caused to:

classify the at least two partially temporally overlapping audio signals using at least one of audio analysis of the at least two partially temporally overlapping audio signals or video analysis of the video signal.

9. The apparatus as claimed in claim 1, wherein the apparatus is further caused to:

identify a sound source in the video signal, and classify at least one audio signal of the at least two partially temporally overlapping audio signals associated with the identified sound source as the first audio signal.

10. The apparatus as claimed in claim 1, wherein the apparatus is further caused to:

identify a sound source as not being in the video signal, and classify at least one audio signal of the at least two partially temporally overlapping audio signals associated with the identified sound source as the second audio signal.

11. The apparatus as claimed in claim 1, wherein the second audio signal introduces the second delay during a first mode and the apparatus is further caused to:

process the second audio signal wherein the processing of the second audio signal introduces the first delay such that the processed first audio signal and the processed second audio signal are time synchronized during a second mode.

12. The apparatus of claim 11, wherein the first mode is a participant mode and the second mode is a non-participant mode.

13. A method comprising:

receiving or obtaining at least two partially temporally overlapping audio signals and a video signal for processing;

classifying a first audio signal of the at least two partially temporally overlapping audio signals as a non-speech signal;

classifying a second audio signal of the at least two partially temporally overlapping audio signals as a speech signal, wherein the second audio signal is to be processed with less delay than the first audio signal;

processing the first audio signal wherein the processing introduces a first delay; and processing the second audio signal wherein the processing introduces a second delay, wherein the second delay is shorter than the first delay.

14. The method as claimed in claim 13, comprising a first path comprising a first audio coder and a second path comprising a second audio coder, wherein the first audio signal is directed along the first path to be processed, with the first delay and the second audio signal is directed along the second path to be processed.

15. The method as claimed in claim 14, wherein the second path is optimized for minimum delay.

16. The method as claimed in claim 14, wherein the first path is optimized for audio-video synchronization.

17. A non-transitory computer readable medium comprising program instructions stored thereon that when executed by at least one processor perform at least the following:

receiving or obtaining at least two partially temporally overlapping audio signals and a video signal for processing;

classifying a first audio signal of the at least two partially temporally overlapping audio signals as a non-speech signal;

classifying a second audio signal of the at least two partially temporally overlapping audio signals as a speech signal, wherein the second audio signal is to be processed with less delay than the first audio signal;

processing the first audio signal wherein the processing introduces a first delay; and processing the second audio signal wherein the processing introduces a second delay, wherein the second delay is shorter than the first delay.

* * * * *